March 8, 1938.　　　P. L. CRITTENDEN　　　2,110,720
COMPRESSOR UNLOADING DEVICE
Filed Aug. 17, 1934

INVENTOR
PHILIP L. CRITTENDEN
BY　*Wm. M. Cady*
ATTORNEY

Patented Mar. 8, 1938

2,110,720

UNITED STATES PATENT OFFICE 2,110,720

COMPRESSOR UNLOADING DEVICE

Philip L. Crittenden, Edgewood, Pa., assignor to The Westinghouse Air Brake Company, Wilmerding, Pa., a corporation of Pennsylvania Application August 17, 1934, Serial No. 740,212

19 Claims. (Cl. 230—29)

This invention relates to compressor unloading devices, and particularly to compressor unloading devices operated by the pressure of the fluid lubricant supplied to the bearings of the compressor.

In my copending application, now Patent 2,017,684, issued October 15, 1935 and assigned to the assignee of the present application, there is disclosed and claimed a compressor unloading mechanism wherein the unloader valve is actuated to unloading position by a spring acting through a pivoted operating lever. Actuation of the valve to loading position is accomplished by another spring and by the pressure of fluid compressed by the compressor when the pressure of the fluid lubricant in a pressure system, including a pump driven from the crank shaft of the compressor, increases sufficiently to overcome the force of the first mentioned spring.

A similar operating mechanism for actuating the unloader valve is also disclosed and claimed in the copending application, now Patent 2,042,085 of Burton S. Aikman, issued May 26, 1936, and assigned to the assignee of the present application.

The construction in both patents is subject to the disadvantage that upon failure or breakage of the spring effective to actuate the valve to unloading position, the compressor is not unloaded automatically but remains in loaded condition, even though the compressor stops completely.

It is an object of this invention to obviate the above-mentioned difficulty and provide a construction and arrangement whereby operation of the unloader valve to unload the compressor is effected positively by the pressure of the fluid compressed by the compressor and without reliance on the integrity of a spring, whenever the speed of the compressor reduces below a certain speed.

It is another object of this invention to provide means for reducing the noise of operation of a compressor and especially to prevent chattering of the unloading valve upon its seat.

Figure 1:
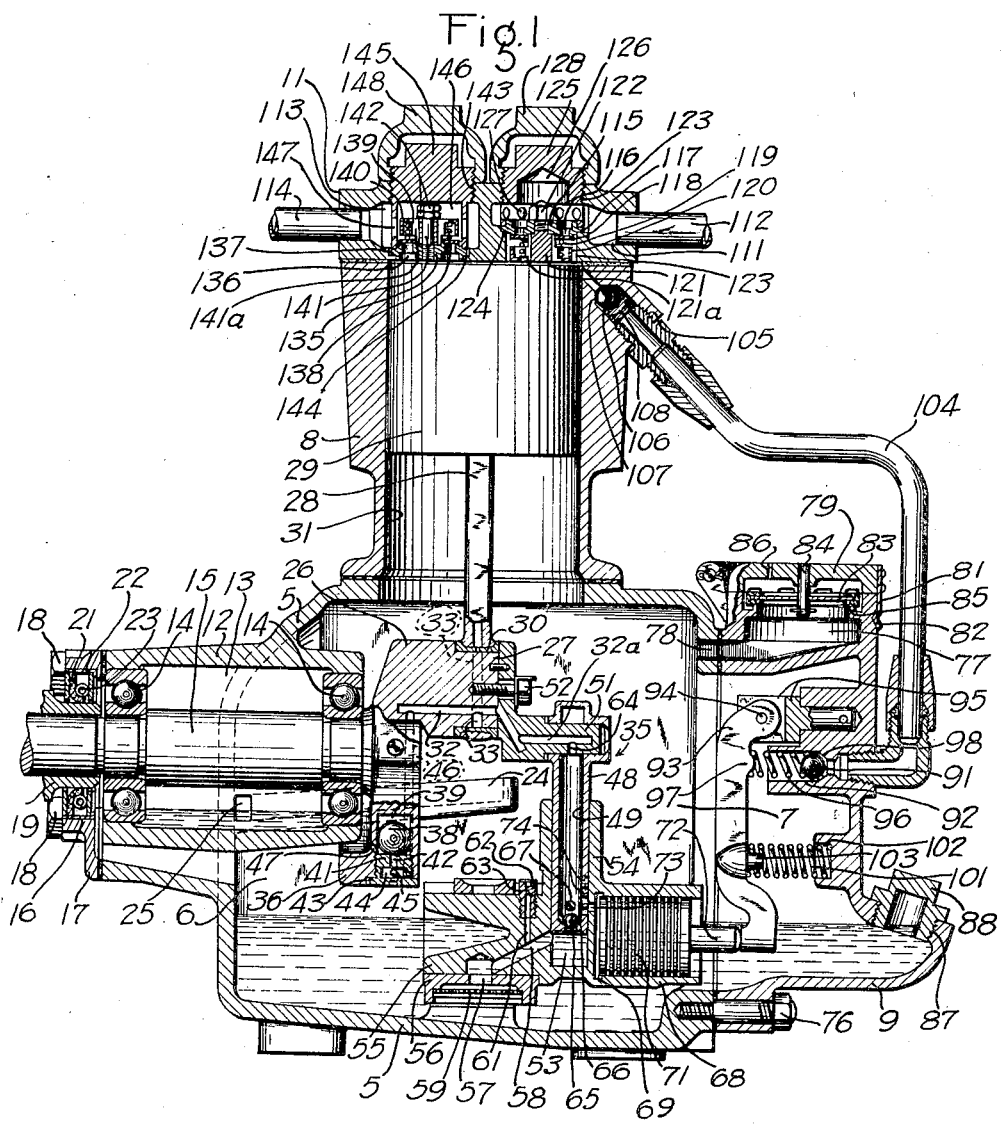
Figure 2:
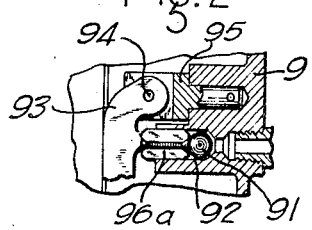

Other objects and advantages of this invention will be made apparent in the subsequent description thereof, when read in connection with the accompanying drawing, wherein Fig. 1 is a vertical sectional view of a single stage compressor to which my invention is illustratively applied, and Fig. 2 is a fragmentary sectional view, showing a modified construction for operating the unloading valve.

In Fig. 1, the compressor shown, comprises a sectional casing including a crank case section 5 enclosing a crank case chamber 6 and having an open end 7, a cylinder or piston section 8, an end section 9 for closing the open end 7 of the crank case section 5, and an intake and discharge valve section 11.

The wall of the crank case section 5 opposite the end opening 7 supports a horizontal tubular journal member 12, preferably integrally formed therein, which encloses a bearing chamber 13 having therein suitable anti-friction bearings, such as the ball bearings 14, for supporting a rotatable crank shaft 15. The crank shaft 15 extends exteriorly of the journal member through an opening 16 in a closure member 17 that is secured to the end of the journal member and to casing section 5 by means of screws or bolts 18.

The compressor may be driven by any form of motor device, such as an electric motor or internal combustion engine, that is operatively connected to the exterior portion of the crank shaft 15 by means of a pulley wheel or gear wheel, a portion 19 of the hub of which is shown.

Any suitable means may be provided for sealing the opening 16 against fluid lubricant leakage therethrough, such as the packing ring gasket 21, which is suitably supported within a retainer 22 secured within the closure member 17. The packing ring gasket 21 is pressed radially inward against the exterior surface of hub portion 19 by a retaining spring-tensioned ring 23.

A trough or channel 24 secured to or formed in the side wall of the crank case section 5 opens into the bearing chamber 13 through an opening 25 and fluid lubricant centrifugally thrown from the crank shaft is collected therein and conducted by gravitation into the bearing chamber 13, from whence the fluid lubricant flows, past the ball bearings 14, back into the crank case chamber 6.

The crank shaft 15 is provided with a counterbalanced crank arm 26 having a crank pin 27, to which is connected in the usual manner, a connecting rod 28 for operating a compressor piston 29 in the bore 31 of the piston section 8, so that as the crank shaft 15 is rotated, the piston is reciprocated in the bore. For simplicity, the usual piston rings for the piston 29 have been omitted from the drawing.

Connecting rod 28 is provided with a suitable bearing 30 engaging the crank pin 27, and fluid lubricant from crank case chamber 6 is supplied thereto through a passage 32 and branch passages 33, by means of a reciprocating pump 35 which is operated by rotation of the crank shaft 15.

A suitable speed-responsive device is provided for controlling the outlet of fluid lubricant from passage 32 to vary the pressure of the fluid lubricant therein as supplied from the pump 35, which device may comprise a ball check valve 38, disposed in the inner portion of a bore 39, which extends radially inward from the outer peripheral surface of the counterbalancing portion 36 of the crank arm 26, the outer portion of the bore 39 being threaded to receive firstly, a threaded disc 41, having an axial port 42 extending therethrough, and secondly, a screw plug 43, having an inner bore 44 into which the port 42 of the disc 41 opens. The screw plug 43 is provided with a laterally extending port 45 in the side wall thereof, which port connects the bore 44 with a branch passage 46, in the crank arm 26, leading to passage 32, when the screw plug is tightly screwed into the bore 39.

The ball check valve 38 is designed to be of such weight that the centrifugal force acting thereon, upon rotation of the crank shaft 15 above a predetermined speed, is sufficient to cause the ball check valve to maintain the port 42 closed against the pressure of fluid lubricant tending to unseat the ball valve and supplied from passage 32 through the branch passage 46, port 45, bore 44, and port 42. When the crank shaft 15 rotates at less than the predetermined speed, the pressure of the fluid lubricant supplied from passage 32 is sufficient to unseat the ball check valve against the centrifugal force acting thereon, and fluid lubricant thus escapes past the ball check valve, through the inner portion of the bore 39, and out into the crank case chamber 6 through a port 47.

The pump 35 may comprise a tubular piston 48, having a longitudinal bore 49, which piston is pivotally connected at one end to a crank pin 51 secured in eccentric relation to the center of rotation of crank shaft 15 at the end of the crank pin 27 by screws 52, only one of which is shown. Upon rotation of the crank shaft 15, piston 48 is reciprocated within a chamber 53 of a piston cylinder 54, which is provided with a trunnion portion 55 pivotally mounted within a bearing member 56 secured to the crank case section 5, whereby angular movement of the piston cylinder 54 is permitted, in following the movement of the crank pin 51.

Fluid lubricant from crank case chamber 6 is supplied to the piston chamber 53, at a point immediately below the upper extremity of movement of the piston 48, through a port or opening 57 in the bearing 56 and a passage 58 in the trunnion portion 55 connecting the piston chamber 53 and the port 57. A screen 59, which extends across the port 57, prevents the entrance of foreign particles into the piston chamber 53.

In accordance with one of the objects of my invention, I provide a bore 61 in the trunnion portion 55 of the piston cylinder 54, which bore connects passage 58 to the space in crank case chamber 6 above the level of the fluid lubricant therein, and a choke plug 62 screwed into the outer enlarged threaded portion of the bore 61, which plug is provided with a restricted port or passage 63 therein, the purpose of which will be explained hereinafter.

The bore 49 of the piston 48 communicates with a passage 32a in the crank pin 51 through a port 64, the passage 32a being connected to the passage 32 in the crank pin 27. An inlet port 65, in the opposite or lower end of the piston 48, connects the bore 49 with the piston chamber 53, and a ball check valve 66 disposed in the bore 49 of the piston is adapted to unseat to permit fluid lubricant to pass from piston chamber 53 into the bore 49 through the port 65, and to reseat to close the port 65 and thereby prevent reflux of fluid lubricant from the bore 49. A pin 67, extending across the piston within the bore 49, serves to limit the extent of the opening movement of the ball check valve 66.

The piston cylinder 54 is provided with a horizontally disposed cylindrical extension 68 opposite the trunnion portion 55, which extension is provided with a chamber 69 opening into the crank case chamber 6. Disposed within the chamber 69 is a suitable pressure responsive device, such as the piston 71, having a continuous helical groove on the outer surface thereof adapted to receive fluid lubricant from the crank case chamber for lubricating and sealing purposes, which piston is provided with a stem 72 extending into the crank case chamber 6. Communication is established between the inner or confined portion of the chamber 69 of extension 68 and bore 49 of the piston 48, through a port 73 in the wall of piston cylinder 54 and a series of ports 74 in the wall of piston 48, the ports 74 being adapted to register successively with the port 73 upon movement of the piston 48.

It will be apparent from the foregoing that upon rotation of the crank shaft 15, the upward stroke of pump piston 48 creates a vacuum or partial vacuum in the piston chamber 53 whereby the static head of the fluid lubricant in the crank case chamber, as well as the air pressure acting down on the surface of the fluid lubricant in the crank case chamber, causes fluid lubricant to be supplied to the piston chamber through screen 59, port 57, and passage 58, after the piston 48 uncovers the passage 58. At the same time, due to the higher pressure of the air in the crank case chamber above the fluid lubricant therein relative to the partial vacuum in the piston chamber 53, a certain amount of air is admitted to passage 58 through the choke plug 63 and enters the piston chamber 53 along with the fluid lubricant. The fluid lubricant being supplied through passage 58 from the crank case chamber immediately closes up the port 61 and the air admitted through the choke plug is trapped in the fluid lubricant admitted to the piston chamber, so that instead of there being a homogeneous incompressible column of fluid lubricant in the piston chamber, there is a slightly compressible column comprising a mixture of air and fluid lubricant.

On the downward stroke of the piston 48, the piston closes the passage 58 upon initial movement and upon further movement exerts a compressive force on the mixture of air and fluid lubricant trapped in the piston chamber 53 below the entrance of passage 58 thereinto. It will be observed that the compressibility of the air commingled with the fluid lubricant trapped in the piston chamber, imparts a cushioning effect to the downward movement of the pump piston 48 so that the usual shock, and noise incident thereto, of the resistance to the movement of the pump piston exerted by a homogeneous incompressible column of fluid lubricant is eliminated. One function of the choke plug 62 is thus to admit cushioning air to the pump piston chamber. However, it has another function and effect, as will be hereinafter pointed out.

The compressive force exerted by pump piston 48 on the mixture of air and fluid lubricant in the piston chamber 53 causes the check valve 66 to unseat and permit the mixture of air and fluid lubricant to flow therepast into the bore 49, whence upon successive downward strokes of the pump piston it is forced upwardly into passages 32a and 32. I have observed, incidently, that in some cases, a certain noise of operation of the pump piston may be reduced or eliminated by varying the distance of the limiting pin 67 from the ball check valve 63 to vary the extent of opening movement thereof.

If the crank shaft is rotating at less than the above mentioned predetermined speed there is no build-up of pressure in the fluid lubricant system due to the fact that the ball check valve 38 is unseated by the pressure of the fluid lubricant which escapes from passage 32 through branch passage 46, past the ball check valve 38, and out at the port 47 into the crank case chamber 6. On the other hand, if crank shaft 15 rotates at a speed higher than the predetermined speed, ball check valve 38 closes as previously described, thus closing off the outlet of fluid lubricant through port 47 and causing a build-up of fluid lubricant pressure in the bore 49 of the piston 48 and in the chamber 69 of the cylindrical extension 68, which pressure is sufficient to move the piston 71 and its stem 72 outwardly.

The end section 9, which is secured to the crank case section 5 by suitable screws or bolts 76, one of which is shown, is provided at its upper portion with a spout or opening 77 that communicates with the crank case chamber 6 through a passage 78 in the end wall of the crank case section 5, fluid lubricant being poured therethrough into the crank case chamber 6.

Any suitable cap or cover may be provided for closing the opening 77 as, for example, the cap member 79, which is suitably hinged to the casing section 9 and provided with a spring clamp 81 for engaging a notch 82 in the casing 9 to maintain the cap member in closed position. The cap member 79 may also, as shown, be adapted to permit the release of pressure within the crank case chamber 6 and to prevent the influx of air or foreign particles into the crank case chamber by means of a check valve disc 83 slidably carried on a pin 84 secured to the cap member, check valve disc 83 being adapted to seat upon an annular seat rib 85 surrounding the opening 77. The valve disc 83 is unseated when the pressure within the crank case chamber 6 exceeds atmospheric pressure, equalization of pressure being effected through an atmospheric port 86 in the cap member above the valve disc.

The lower portion of the end section 9 is provided with a threaded opening 87 through which the level of the fluid lubricant in the crank case section 6 may be determined, as well as drainage of the fluid lubricant from the crank case chamber effected, if so desired, a screw plug 88 being provided to close the opening 87.

In accordance with another object of my invention, I provide an unloading mechanism comprising the ball check valve 91, disposed in a bore 92, which extends through the wall of the end casing section 9, and an operating lever 93 for the valve 91, which lever is pivotally mounted at one end above the valve 91, on a pin 94 secured to a lug 95 which is suitably attached to the inner surface of the wall of the casing section 9, the opposite end of the lever 93 being engaged by the end of the stem 72 of the piston 71. A relatively stiff spring 96 is interposed between the lever 93 and the ball check valve 91, one end of the spring being supported by a lug 97 on the lever and the other end being supported within the bore 92, so that the ball check valve 91 is moved into seated relation on a valve seat constituted by a tapered shoulder 98 in the bore 92, when the lever 93 is moved in a counterclockwise direction. A rigid member, such as the fluted stem 96a, may be employed instead of the spring 96, as shown in Fig. 2.

Another spring 101, supported at one end in a recess 102 in the wall of the end casing section 9 and at the opposite end by a lug 103 on the lever 93, which lug is situated at a point between the lug 97 and the end of the lever 93 which engages the stem 72 of the piston 71, is provided for biasing the lever 93 in a clockwise direction whereby the lever is caused to firmly engage the end of the stem 72 for preventing a chattering noise at the point of contact. The spring 101 is not necessary for the operation of the compressor, it being desirable only as a means for reducing operating noise.

It should be noted that the spring 96 is of such length that when the lever 93 is in the position shown in Fig. 1, the ball check valve 91 is unseated from the valve seat 98. This is because the spring 96 is so stiff, that is, so highly tensioned, that appreciable unseating movement of the check valve might not be permitted if the spring were to hold the valve on its seat.

The outer portion of the bore 92 is threaded to receive the end fitting of a pipe 104, the end fitting on the opposite end of which is threaded into the outer portion of a bore 105 in the wall of the piston section 8, the bore 105 opening into the compression chamber portion of the bore 31 at a point adjacent to the intake and discharge valve casing section 11. A ball check valve 106 is disposed in the bore 105 and is biased toward seating relation on a valve seat constituted by a tapered shoulder 107 in the bore 105, by a spring 108 in opposition to the pressure of fluid compressed in the compression chamber.

The casing section 11 contains a cylindrical intake valve chamber 111, into which an intake pipe 112 opens, and a cylindrical discharge valve chamber 113 out of which leads a discharge pipe 114.

Any suitable intake valve and discharge valve mechanism may be provided in the casing section 11. The intake valve mechanism, shown for purposes of illustration, may comprise a valve seat disc 115 having a plurality of intake ports 116, extending axially therethrough, and a peripheral rib 117. An annular valve disc 118 is biased into seated relation on one face of the seat disc 115 to close the ports 116, by a spring 119 which is interposed between the valve disc 118 and a flanged collar 120. The flanged collar 120 has a hub or central stem portion 121, for securing the collar in spaced relation to the seat disc. The stem 121 passes through the central opening in the valve disc 118, and has a shoulder engaging one face of the seat disc, and a threaded portion extending through a central threaded opening or hole in the seat disc 115, which threaded portion is adapted to have a lock nut 122 screwed thereon into engagement with the opposite face of the seat disc. Axially extending passages 121a in the stem 121 are provided to permit the flow of fluid from the ports 116 through the central opening in the valve disc 118, when the valve disc is unseated from the face of the seat disc 115, whereby a rapid flow of fluid past the valve disc may be effected.

The assembled intake valve mechanism, is inserted as a unit, with the flanged collar 120 entering first, into a bore 123 extending through the casing section 11 and perpendicularly intersecting the intake valve chamber 111, the valve mechanism being adapted to be supported on an annular shoulder 124, surrounding the bore 123 in the intake valve chamber 111, which shoulder engages the peripheral rib 117 of the seat disc 115. The shoulder 124 is so positioned that when the valve mechanism is supported thereon, the lower face of the flanged collar 120 is substantially flush with the inner surface of the casing section 11.

A screw plug 125, screwed into the outer portion of bore 123, is adapted to secure the valve mechanism within the bore 123, the plug being bored and counterbored to provide a recess or chamber 126 therein and an outer rim, which rim fits closely around the seat disc 115 and engages the peripheral rib 117 to press it tightly in sealed relation against the shoulder 124. Recess 126 in the screw plug 125, communicates with the intake valve chamber 111 through a plurality of ports 127 in the outer rim of the screw plug.

A cap nut 128, screwed over the exposed threads of the screw plug 125, serves to lock the plug in position and in some measure to prevent unauthorized access to the valve mechanism.

The discharge valve mechanism is similar in construction to the intake valve mechanism, just described, and may comprise a valve seat disc 135 having a plurality of discharge ports 136 therein and a peripheral rib 137, a valve disc 138 being biased into seated relation on one face of the valve seat disc 135 to close the ports 136, by a spring 139 interposed between the seat disc and a flanged collar 140. The flanged collar 140 is provided with a central stem or hub which passes through the central opening in the annular valve disc 138 and rests on the face of the seat disc 135, a stud bolt 141, secured in a central threaded bore in the seat disc, being inserted through a central bore in the hub portion of the flanged collar 140 and being provided with suitable nuts 142 for securing the flanged collar to the seat disc 135. Axially extending passages 141a in the hub portion of the flanged collar 140 provide a path for the flow of fluid from ports 136 through the central opening in the annular valve disc 138.

The discharge valve mechanism is inserted as a unit, with the seat disc 135 entering first, into a bore 143 extending through the casing section 11 and perpendicularly intersecting the discharge valve chamber 113, the valve mechanism being adapted to be supported on an annular shoulder 144, surrounding the bore 143 in the discharge valve chamber 113, which shoulder engages the peripheral rib 137 of the seat disc 135. The shoulder 144 is so positioned that when the valve mechanism is supported thereon, the lower face of the valve seat disc 135 is substantially flush with the inner surface of the casing section 11.

A screw plug 145, screwed into the outer portion of the bore 143, is adapted to secure the valve mechanism within the bore 143, the plug being bored to provide a recess or chamber 146 therein and an outer rim, which rim fits closely around the seat disc 135 and engages the peripheral rib 137 to press it tightly in sealed relation against the shoulder 144. The recess 146 of the screw plug 145, into which the flanged collar 140 extends, communicates with the discharge valve chamber 113 through a plurality of ports 147 in the outer rim of the screw plug.

A cap nut 148, similar to the cap nut 128, is screwed over the exposed threads of the screw plug 145.

Upon the suction or downward stroke of the compressor piston 29, fluid is drawn into the compression chamber above the piston 29 through the intake pipe 112 and past the outer and inner edges of annular valve disc 118, which is unseated against the tension force of the spring 119 by the higher pressure in recess 126 and intake chamber 111. Upon the compression or upward stroke of piston 29, valve disc 118 is seated to prevent the reflux of fluid therepast, and annular valve disc 138 of the discharge valve mechanism is unseated against the force of the spring 139, the compressed fluid flowing past the outer and inner edges of the valve disc 138 and out through the discharge pipe 114.

In operation, assuming the parts of the compressor to be in the position shown in Fig. 1, fluid compressed by the piston 29 within the compression chamber portion of bore 31, will be forced past the ball check valve 106, through pipe 104, past the unloading ball check valve 91, through crank case chamber 6, passage 78, opening 77, past valve disc 83 which unseats upon higher pressure being built up within the crank case chamber 6, and to atmosphere through the port 86.

As the speed of rotation of the crank shaft 15 and, therefore, the speed of operation of the compressor increases, the critical or predetermined speed is passed, beyond which the ball check valve 38 of the speed-responsive mechanism in the crank arm 26 is moved outwardly as previously described, to close the port 42 and cut off the flow of fluid lubricant, from passage 32 in the crank pin 27, to the crank case chamber 6 by way of port 47 in the crank arm. When the ball check valve 38 closes the port 42, the only escape for the fluid lubricant supplied to the passage 32 is through the space between the engaging bearing surfaces of the crank pin 27 and the connecting rod bearing 30, which space is so restricted that continued operation of the pump 35 causes sufficient pressure of fluid lubricant to be developed in the chamber 53 of pump piston 48 and in the chamber 69, that the piston 71 is moved to the right, as viewed in Fig. 1, to move the operating lever 93 in a counterclockwise direction. The ball check valve 91 is thus moved to seated position on its seat 98, to cut off the unloading communication to atmosphere, previously described, the tension developed by the compression of spring 96 being adequate to prevent opening movement of the ball check valve 91. The loading of the compressor is thus effected only after the compressor attains a predetermined speed of operation, fluid drawn into the compression chamber of the compressor on the suction or down stroke of piston 29 being discharged out through the discharge pipe 114 upon compression or up stroke of the piston.

I have observed that in the operation of the compressor there is a tendency for the unloading ball check valve 91 to chatter on its valve seat, due to the fluctuation of fluid lubricant pressure, acting through the piston 71, which causes the operating lever 93 to vibrate, thereby resulting in an undesirable noise of operation. The spring 96 is accordingly designed to be relatively stiff, that is, to have a relatively high tension, both in order to withstand the relatively high pressures acting thereon and in order that it will continue to maintain sufficient force on the ball valve 91 to maintain it on its seat against the force of compressed fluid supplied through pipe 104, despite the vibration of the operating lever 93, whereby chattering of the valve 91 on its seat is prevented. Furthermore, the vibration of the lever 93 is reduced to a negligible degree due to the effect of the cushioning air admitted through choke plug 62 into the pump piston chamber 53. Since the cushioning air is commingled with the fluid lubricant forced into the bore 49 of the pump piston 48, incipient fluctuations in the pressure of the fluid lubricant in bore 49, which pressure acts continuously on piston 71 through the ports 74 and port 73, are effective to compress this commingled air rather than to cause movement of the piston 71. Thus the tendency for the fluid pressure acting on piston 71 to fluctuate during the operation of the pump while the compressor is operating in a loaded condition is greatly reduced and the result is that the fluid lubricant, through piston 71, continues to exert a substantially constant pressure on the lever 93, so that vibrational movement of the lever 93 is reduced to a negligible degree if not entirely eliminated. The choke plug 62 thus serves to effect substantial elimination of the vibration of the unloading valve operating lever 93 as well as to effect cushioning of the pump piston 48.

In the embodiment of my invention shown in Fig. 1, the spring 96 may be sufficiently effective to prevent chattering of the ball valve 91 on its seat without the effect of the choke plug 62, but in the embodiment shown in Fig. 2, there may be a chattering of the valve 91 on its seat, unless the choke plug 62 is employed, since the rigid fluted stem 96a does not act to bias the ball valve 91 on its seat, as does the spring 96, and variations in the pressure of fluid lubricant applied through piston 71 to lever 93 will be sufficient to permit slight unseating movements of the ball valve. The choke plug 62 is thus of special utility where a rigid member, such as the fluted stem 96a, is employed, since it prevents such variation in the force applied to the lever 93 by the fluid lubricant, through piston 71, as would permit the ball valve 91 to unseat slightly and cause a chattering noise.

If, for any reason, such as in stopping the compressor or as a result of the attained pressure against which the compressor works, the speed of operation of the compressor is reduced below the above mentioned predetermined speed, the speed-responsive ball check valve 38 is unseated and fluid lubricant from passage 32 flows out through port 42, past the ball check valve 38, through port 47, into the crank chamber 6. The pressure of the fluid lubricant in bore 49 of the pump piston 48 and in chamber 69 acting on the piston 71 is thus reduced, and spring 101 is effective to return the piston 71 to the position shown in Fig. 1, the operating lever 93 being moved in a clockwise direction. The tension of spring 96 maintaining the ball check valve 91 on its seat 98, is thus released and, as a result, the pressure of the fluid compressed by the compressor and supplied through pipe 104 is effective to blow or unseat the valve 91 from its seat.

The communication, previously described, between the compression chamber and atmosphere past the unloading valve 91, is thus established and the compressor is thereby unloaded.

If, while the compressor is operating in a loaded condition, the spring 96 fails or breaks, the unloading valve 91 is blown from its seat by the pressure of the fluid compressed by the compressor and supplied through the pipe 104. The unloading of the compressor will thus attract the attention of the operator to the fault, so that he may take immediate steps to remedy it. If the spring 101 fails or breaks while the compressor is operating either in a loaded or unloaded condition, the operating condition remains unchanged and the compressor continues to operate. In such case, there arises only the objectionable noise occasioned by the chattering of the operating lever 93 against the end of the stem 72 of the piston 71. If the spring 101 has broken or failed during the operation of the compressor while loaded, and the speed of operation of the compressor is subsequently reduced below the predetermined speed above mentioned, the tension of spring 96 acts to move the lever 93 in a clockwise direction, so that the tension of spring 96 is released and as a result the ball valve 91 is blown from its seat and the compressor unloaded. In the case of the fluted stem 96a being employed in the above instance, the release of pressure exerted by fluid lubricant, through piston 71, on the lower end of the lever 93, permits the ball valve 91 to be blown from its seat to unload the compressor.

It will thus be apparent that due to the arrangement of the unloading valve and its operating lever which I have devised, movement of the unloading valve 91 to open or unloading position is not under the control of spring pressure, spring 101 being employed merely for maintaining the engagement of the operating lever with the end of the piston stem 72 to prevent chattering at the point of contact.

My present invention, therefore, possesses certain advantages over prior constructions, in that it enables more quiet operation of the compressor, greater reliability which reflects itself in decreased maintenance or service expense, and the unloading of the compressor in a manner placing no reliance on spring pressure, such that the attention of the operator or attendant is immediately attracted upon the occurrence of failure or breakage of necessary parts of the operating mechanism.

While I have illustrated and described but two embodiments of my invention, in connection with a single stage compressor, it will be understood that my invention is equally adaptable to a multi-stage compressor and that various omissions, additions, or changes may be made therein without departing from the spirit thereof. It is not my intention, therefore, to limit the scope of my invention except as required by the prior art and as defined in the appended claims.

Having now described my invention, what I claim as new and desire to secure by Letters Patent, is:

1. A control mechanism for a fluid compressor, comprising valve means operable to effect loading and unloading of the compressor, an operating lever for said valve means, said lever being pivoted at one end and engaging the said valve means at an intermediate point on the lever, and fluid pressure actuated means controlled by the speed of operation of the compressor and adapted to engage the other end of the lever for moving the lever to operate said valve means to effect loading of the compressor, said valve means being so constructed and arranged as to be subject to the pressure of fluid compressed by the compressor and operated thereby to effect unloading of the compressor.

2. A control mechanism for a fluid compressor, comprising a valve operable into one position for effecting the loading of the compressor and out of said position for effecting the unloading of the compressor, an operating lever for said valve pivoted at one end, fluid pressure actuated means controlled by the speed of operation of the compressor for engaging the other end of said lever to move it about the pivoted end, and means interposed between said valve and said lever at a point on the lever intermediate the ends thereof, whereby movement of the lever occasioned as a result of actuation of the fluid pressure actuated means is effective to move the said valve into the said one position to effect loading of the compressor.

3. A control mechanism for a fluid compressor, comprising a valve operable into one position for effecting the loading of the compressor and out of said position for effecting the unloading of the compressor, an operating lever for said valve pivoted at one end, fluid pressure actuated means controlled by the speed of operation of the compressor for engaging the other end of said lever to move it about the pivoted end, and resilient means interposed between said valve and said lever at a point on the lever intermediate the ends thereof, whereby movement of the lever occasioned as a result of actuation of the fluid pressure actuated means is effective to move the said valve into the said one position to effect loading of the compressor, said resilient means being adapted to compensate for vibratory movements in said lever and maintain said valve in the said one position when said fluid pressure actuated means is actuated.

4. A control mechanism for a fluid compressor, comprising valve means operable to effect loading and unloading of the compressor, an operating lever for said valve means pivoted at one end, and engaging said valve means at an intermediate point on said lever, fluid pressure actuated means adapted to operatively engage the opposite end of said lever for moving it to operate said valve means to effect loading of the compressor, means responsive to the speed of operation of the compressor for effecting the actuation of said fluid pressure actuated means when the speed of operation of the compressor exceeds a predetermined speed, said valve means being so constructed and arranged as to be subject to the pressure of fluid compressed by the compressor and operated by such fluid under pressure to effect the unloading of the compressor when the speed of operation of the compressor reduces below said predetermined speed.

5. The combination in a fluid compressor having a crank shaft, a pump operated by the crank shaft for supplying fluid lubricant under pressure to the bearings of the compressor, and a control mechanism for said compressor including a valve adapted to seat on a cooperating valve seat to close a communication through which said compressor is unloaded, an operating lever for said valve adapted to move said valve into seating relation on its valve seat in response to a variation in the pressure of the fluid lubricant supplied by said pump to the bearings of the compressor, of means for reducing the vibrational movement of said operating lever, caused by operational fluctuations in the pressure of the fluid lubricant supplied by said pump and resulting in a chattering of said valve on its seat, said means comprising a passage for admitting air along with fluid lubricant into said pump.

6. The combination in a fluid compressor comprising a casing having a crank case chamber, a crank shaft, a pump operated by the crank shaft for supplying fluid lubricant under pressure to the bearings of the compressor, and a control mechanism for said compressor including a valve adapted to seat on a cooperating valve seat to close a communication through which said compressor is unloaded, an operating lever for said valve adapted to move said valve into seating relation on its valve seat in response to a variation in the pressure of the fluid lubricant supplied by said pump to the bearings of the compressor, of means for reducing the vibrational movement of said operating lever, caused by operational fluctuations in the pressure of the fluid lubricant supplied by said pump and resulting in a chattering of said valve on its seat, said means comprising a passage for admitting air from said crank case chamber along with fluid lubricant into said pump.

7. The combination in a fluid compressor comprising a casing having a crank case chamber, a crank shaft rotatable in said crank case chamber, a pump operated by said crank shaft for supplying fluid lubricant from the said crank case chamber to bearings of the compressor, a valve adapted to engage a valve seat to close a communication through which the compressor is unloaded, an operating lever for effecting movement of said valve into engagement with its seat, and pressure responsive means actuated by variations in the pressure of the fluid lubricant supplied by said pump, for moving said lever to cause said valve to engage its seat, of means for reducing the vibration of said valve operating lever occasioned by operational fluctuations in the pressure of the fluid lubricant supplied by said pump whereby to prevent chattering of said valve on its seat, including means for admitting air into said pump, along with fluid lubricant, whereby the pressure acting on said pressure responsive means is rendered substantially constant.

8. The combination with a fluid compressor having an operating shaft, and a pump operated by operation of said shaft for circulating liquid under pressure, of a valve controlled by the opposing forces exerted by the pressure of the fluid compressed by the compressor and by the pressure of the circulating liquid and operative to load or unload the compressor dependent on the pressure of the circulating liquid, and means for introducing quantities of gas into the circulating liquid for minimizing operational fluctuations in the circulating liquid pressure tending to vibrate said valve.

9. The combination with a fluid compressor having an operating shaft, a pump operated by operation of said shaft for circulating liquid under pressure, of a valve operable to load and unload the compressor, a lever for operating said valve, means responsive to variations in the pressure of the circulating liquid for moving said lever to operate said valve, and means for introducing quantities of gas into the circulating liquid for minimizing operational fluctuations in the pressure of the circulating liquid and thereby reducing vibratory movement of said lever.

10. The combination with a fluid compressor having a crank chamber containing fluid lubricant, and a crank shaft in said chamber, of a reciprocating pump operated by rotation of said crank shaft for supplying fluid lubricant from the crank chamber to moving parts of the compressor and having an intake passage extending below the level of the fluid lubricant in the crank chamber, a valve controlled by the opposing forces exerted by the pressure of fluid compressed by the compressor and by the pressure of the fluid lubricant supplied by said pump and operative to load or unload the compressor dependent on the fluid lubricant pressure, and a passage establishing communication between the space above the fluid lubricant in the crank chamber and the said intake passage for said pump, through which passage a gas is introduced into the fluid lubricant supplied by said pump for minimizing operational fluctuations in the fluid lubricant pressure tending to vibrate said valve.

11. A control mechanism for a fluid compressor, comprising a valve effective when in one position to cause loading of the compressor and when out of said one position to cause unloading of the compressor, a lever for moving said valve, said lever being pivoted at one end and cooperating with the said valve at a point intermediate the ends of the lever, fluid pressure responsive means actuated upon an increase in the pressure of fluid acting thereon for moving the other end of the lever pivotally about the said one end to move the said valve into and hold it in the said one position to cause loading of the compressor, and means for causing the pressure of the fluid acting on said fluid pressure responsive means to exceed the said certain pressure only when the compressor operates at a speed in excess of a certain speed.

12. A control mechanism for a fluid compressor, comprising a valve controlling a communication through which fluid under pressure is vented to unload the compressor, a valve seat for said valve, said valve being effective when seated on the valve seat to close the communication and thereby to cause the compressor to be loaded, and when unseated from the valve seat to open the communication and thereby to cause the compressor to be unloaded, a lever for moving said valve into seated relation on the valve seat, said lever being pivoted at one end and cooperating with the valve at a point intermediate the ends of the lever, fluid pressure actuated means effective upon an increase in fluid pressure acting thereon to pivotally move the other end of the lever so that the lever moves the valve toward and into seated relation on the valve seat, and means for controlling the pressure of the fluid acting on the fluid pressure actuated means dependent upon the speed of operation of the compressor.

13. A control mechanism for a fluid compressor, comprising a valve controlling a communication through which fluid under pressure is vented to unload the compressor, a valve seat for said valve, said valve being effective when seated on the valve seat to close the communication and thereby to cause the compressor to be loaded, and when unseated from the valve seat to open the communication and thereby to cause the compressor to be unloaded, a lever for moving said valve into seated relation on the valve seat, said lever being pivoted at one end and cooperating with the valve at a point intermediate the ends of the lever, fluid pressure actuated means effective upon an increase in fluid pressure acting thereon to pivotally move the other end of the lever so that the lever moves the valve toward and into seated relation on the valve seat, and means for controlling the pressure fluid acting on the fluid pressure actuated means dependent upon the speed of operation of the compressor, the pressure of the fluid acting on the fluid pressure actuated means being effective through said lever to hold said valve in seated relation on the valve seat against the pressure of the fluid in the communication, and the pressure of the fluid in the communication being effective to unseat the valve and thereby unload the compressor when the pressure of the fluid acting on the fluid pressure actuated means decreases sufficiently.

14. The combination with a compressor having a casing embodying a compression chamber and a crank-case chamber, the crank-case chamber being in communication with the atmosphere, of an unloading communication connecting the compression chamber to the crank-case chamber, a valve controlling said communication, an operating lever for said valve pivoted at one end thereof on the casing and within the crank-case chamber, and fluid pressure responsive means within the crank-case chamber actuated, according to the speed of operation of the compressor, for moving the opposite end of the lever in one direction, said valve being moved by said lever upon movement thereof in the said one direction, to close said communication and thereby effect loading of the compressor.

15. A control mechanism for a fluid compressor, comprising a pump for supplying fluid lubricant under pressure to parts of the compressor, a valve effective when in one position to cause loading of the compressor and when out of said one position to cause unloading of the compressor, said valve being subject to the pressure of fluid compressed by the compressor and tending to shift said valve out of said one position, and means actuated by the pressure of fluid lubricant supplied by said pump for shifting the said valve into and holding said valve in said one position against the opposing pressure of the fluid compressed by the compressor as long as the pressure of the fluid lubricant exceeds a certain pressure, and means for preventing the pressure of fluid lubricant, as supplied by said pump, from exceeding said certain pressure as long as the speed of the compressor is below a certain speed.

16. A fluid compressor unloading mechanism comprising, in combination, a pump for supplying fluid lubricant under pressure to parts of the compressor, means controlled by the speed of the compressor and operative to cause an increase in pressure of the fluid lubricant as supplied from said pump, a valve subject to the pressure of fluid compressed by the compressor and shifted thereby to an open position for establishing a communication through which fluid under pressure is released from a compression chamber of the compressor to atmosphere and the compressor thereby unloaded, and means for exerting a force on the said valve proportional to the lubricant pressure in opposition to the force of the fluid compressed by the compressor, said valve being shifted by the last said means to a closed position to prevent the release of fluid under pressure from the compression chamber of the compressor through said communication and thereby to cause loading of the compressor when the pressure of the fluid lubricant exceeds a certain uniform pressure.

17. A fluid compressor unloading mechanism comprising, in combination, a pump for supplying fluid lubricant under pressure to parts of the compressor, means responsive to the speed of operation of the compressor for causing the pressure of the fluid lubricant, as supplied by said pump, to increase above a certain uniform pressure only when the speed of operation of the compressor exceeds a certain uniform speed, a valve subject to the pressure of fluid in a compression chamber of the compressor and actuated by the pressure of such fluid to open a communication through which the fluid under pressure is released from the compression chamber to atmosphere to unload the compressor, and means for causing the pressure of the fluid lubricant to be exerted on said valve in opposition to the pressure of the fluid compressed by the compressor, said valve being shifted to and held in closed position to prevent the release of fluid under pressure from the compression chamber of the compressor through said communication to thereby effect loading of the compressor only when the pressure of the fluid lubricant is above said certain uniform pressure.

18. A fluid compressor unloading mechanism comprising, in combination, a pump for supplying fluid lubricant under pressure to parts of the compressor, means responsive to the speed of operation of the compressor for causing the pressure of the fluid lubricant, as supplied by said pump to increase above a certain pressure only when the speed of operation of the compressor exceeds a certain speed, a valve so constructed and arranged that it is urged in one direction by the pressure of fluid compressed by the compressor to establish a communication through which fluid under pressure is released from a compression chamber of the compressor to atmosphere to thereby cause unloading of the compressor, and means for causing the pressure of the fluid lubricant to exert a force on the said valve in opposition to the pressure of the fluid compressed by the compressor, said valve being shifted in the opposite direction by the force exerted by the lubricant to close said communication and prevent release of fluid under pressure from the compression chamber of the compressor through the communication, to thereby effect loading of the compressor, when the fluid lubricant pressure exceeds said certain pressure.

19. A fluid compressor unloading mechanism comprising, in combination, a pump for supplying fluid lubricant under pressure to parts of the compressor, means operative automatically when the speed of the compressor exceeds a certain uniform speed for causing the pressure of the fluid lubricant, as supplied by said pump, to increase above a certain pressure, a valve subject to the pressure of fluid in a compression chamber of the compressor and unseated thereby to establish a communication through which fluid under pressure is released from the compression chamber to atmosphere to cause unloading of the compressor, and means including a movable abutment subject to the pressure of the fluid lubricant and a lever actuated thereby for applying a force to the said valve in opposition to the fluid pressure in the compression chamber and acting on said valve for causing the said valve to be held seated and thereby cause loading of the compressor when the pressure of the fluid lubricant exceeds said certain pressure.

PHILIP L. CRITTENDEN.

CERTIFICATE OF CORRECTION.

Patent No. 2,110,720.   March 8, 1938.

PHILIP L. CRITTENDEN.

It is hereby certified that error appears in the printed specification of the above numbered patent requiring correction as follows: Page 7, first column, line 20, claim 11, after "thereon" insert the words to at least a certain pressure; and that the said Letters Patent should be read with this correction therein that the same may conform to the record of the case in the Patent Office.

Signed and sealed this 27th day of September, A. D. 1938.

Henry Van Arsdale (Seal)   Acting Commissioner of Patents.